Oct. 20, 1931.   C. S. BAKER   1,827,725
CLEARANCE VALVE ASSEMBLY
Filed Oct. 12, 1929
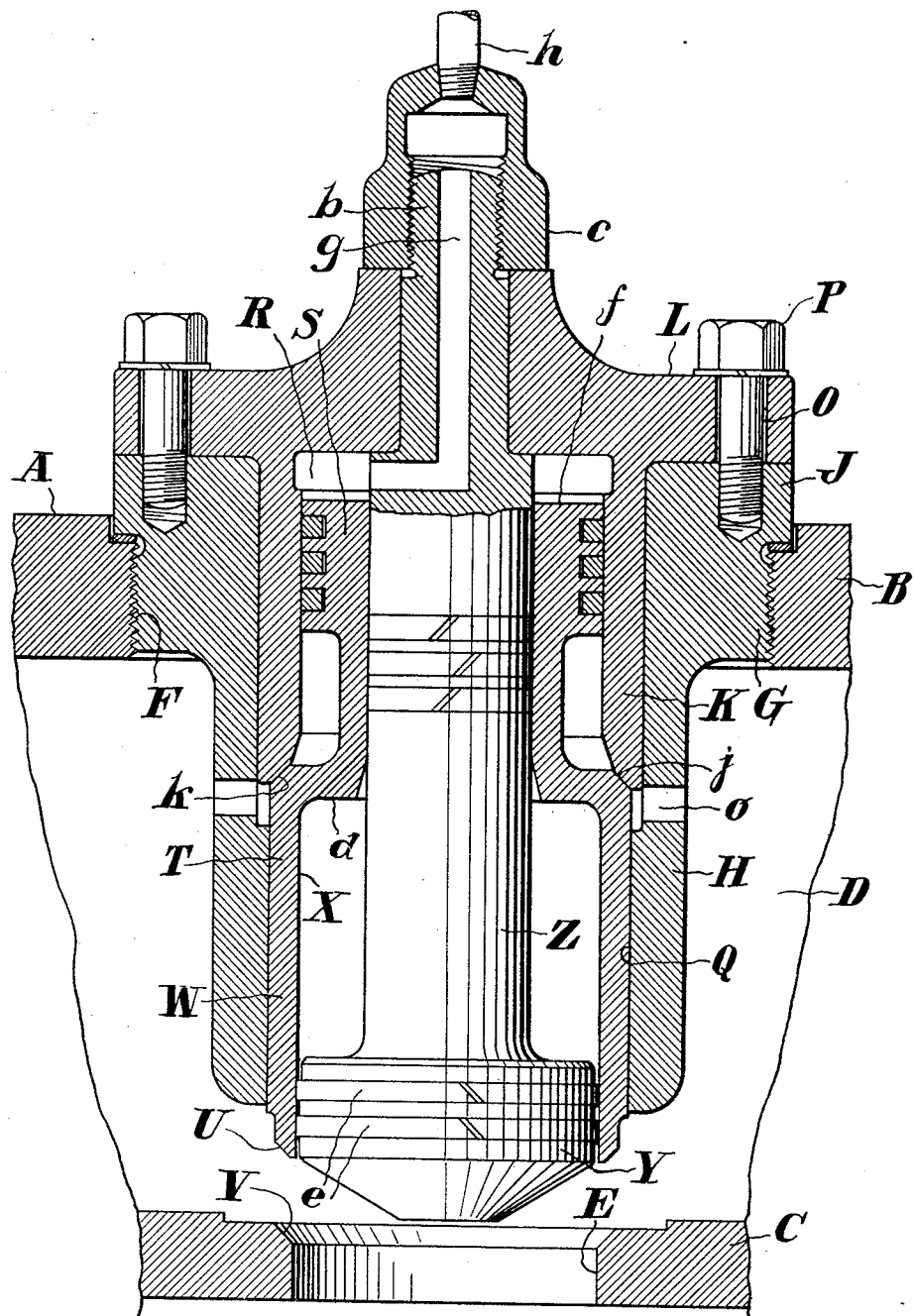
INVENTOR.
Charles S. Baker
BY
HIS ATTORNEY Patented Oct. 20, 1931

1,827,725

UNITED STATES PATENT OFFICE

CHARLES S. BAKER, OF CORNING, NEW YORK, ASSIGNOR TO INGERSOLL-RAND COMPANY, OF JERSEY CITY, NEW JERSEY. A CORPORATION OF NEW JERSEY

CLEARANCE VALVE ASSEMBLY

Application filed October 12, 1929. Serial No. 399,242.

This invention relates to compressors, but more particularly to a clearance valve assembly for machines of this type.

The objects of the invention are to obtain an efficient clearance valve and to adequately cushion the valve by means of pressure fluid for preventing a sharp impact of the valve against the elements which act as stops therefore.

Other objects will be in part obvious and in part pointed out hereinafter.

The figure in the accompanying drawing is a sectional elevation of a clearance valve assembly constructed in accordance with the practice of the invention and showing it applied to a clearance pocket of a compressor.

Referring more particularly to the drawing, A represents the head of a compressor of the type having two spaced walls, such as the walls B and C, to form therebetween a clearance pocket or chamber D which may communicate with the compressor through an aperture E in the wall C.

Formed coaxially with the aperture E and in the wall B is a threaded aperture F to accommodate a threaded flange G of a valve guide H. The valve guide H in this instance comprises an outer member J and an inner member K which lies within the outer member J and has an integral flange L wherein are formed apertures O to accommodate bolts P whereby the inner member K may be secured to the outer member J.

Both members J and K are provided with bores, that in the member J being designated by Q and the bore in the member K being designated by R. The bore R is of somewhat smaller diameter than the bore Q and is adapted to accommodate an extension S of a clearance valve T disposed slidably in the bores and having at its front end a bevelled seating portion U adapted to cooperate with a correspondingly bevelled seat V in the wall C for controlling communication between the clearance chamber D and the cylinder of the compressor.

The forward or enlarged portion W of the valve T is disposed slidably in the bore Q and has therein a cavity to form a chamber X for the accommodation of a head Y carried by a plug Z which extends through the extension and the member K and has a threaded projecting end $b$ to receive a nut $c$ whereby the plug is secured firmly in position. The head Y thus forms a fixed head for the chamber X, and at the innermost end of the chamber X is an actuating area $d$ against which pressure fluid may act to retract the valve.

The head Y is preferably of sufficiently smaller diameter than the diameter of the chamber X so that upon each stroke of the compressor piston a portion of compressed fluid may flow into the chamber X or therefrom, depending upon the direction in which the compressor piston is moving. In order to prevent a too free flow of pressure fluid between the head Y and the wall of the chamber X piston rings $e$ may be disposed in the head Y to fit loosely in the chamber X so that pressure fluid may enter into and flow from the chamber X during the compression and suction strokes of the piston.

The rearward or free end of the extension S of the valve in this instance constitutes a pressure surface $f$ against which pressure fluid may act for closing the valve T and for holding it in the closed position during the time the compressor is operating under full load. Such pressure fluid may be introduced into the bore R through a passage $g$ in the plug Z.

The pressure fluid used for this purpose may be conveyed to the passage $g$ by a pipe $h$ threaded into the nut $c$ and which may lead from a suitable source of supply preferably from the storage receiver (not shown) into which the compressor discharges.

Suitable controlling devices (not shown) may be interposed in the pipe $h$ to automatically introduce pressure fluid into the bore R to hold the valve T upon the seat V during such times that the storage pressure is below the maximum value which it is intended to maintain and to automatically exhaust the pressure fluid from the bore R whenever the maximum pressure in the storage receiver is reached so that the valve T may then open to provide clearance for the compressor cylinder and thus reduce the discharge output to the storage receiver.

Preferably the pressure area $d$ and the pressure surface $f$ are of substantially equal areas, and in order to provide a stop for the valve to limit its rearward or retracting movement a bevelled surface $j$ is formed on the enlarged portion adjacent the extension S to seat against a corresponding bevelled seat $k$ on the member K. Ports $o$ are formed in the skirt of the guide member J adjacent the bevelled seat $k$ to assure the exposure of the bevelled surface $j$ to the same pressure to which the seating portion is exposed in the unseated position of the valve.

Inasmuch that the pressure area $d$ and the pressure surface $f$ are of equal areas it follows that the opposed surfaces of the enlarged portion W of the valve, such as the seating portion U and the bevelled surface $j$ are also of equal areas. Due to this fact the movement of the valve will in no wise be affected by variations in the pressure fluid in the clearance chamber D which it controls. Only those pressures acting against the pressure surface $f$ and the pressure area $d$ will effect the actuation of the valve T which therefore reciprocates without fluttering or without impacting with force against its seats.

The operation of the device is as follows: Let it be assumed that the compressor to which the clearance valve is applied is operating under normal conditions and that the pressure in the storage receiver into which the compressor discharges is somewhat below the maximum predetermined pressure which it is intended to be maintained therein. Under these conditions pressure fluid will be admitted by suitable controlling devices (not shown) through the pipe $h$, the passage $g$ and into the bore R to act against the actuating surface $f$ of the valve for holding the valve firmly seated against the seat V in the wall C. The valve T will be thus held closed by pressure fluid during the time the compressor is operating to build up the predetermined receiver pressure.

Upon each compression stroke of the compressor piston pressure fluid will then flow into the chamber X between the cooperating surfaces of the head Y and the valve. Even though the pressure surface $f$ and the pressure area $d$ are of substantially equal areas, the valve T will remain closed unaffected by the pressure fluid in the pressure chamber. This is due to the fact that upon the suction stroke of the compressor piston a portion of the pressure fluid previously forced into the chamber X will again flow therefrom so that there is a constant induction and eduction of pressure fluid into and from the chamber X. However, a mean effective pressure will exist in the chamber X which, while of insufficient force to unseat the valve during the presence of the pressure fluid in the bore R, will, upon the exhaust of pressure fluid from the bore R, be of sufficient value to open the valve T and maintain it in the open position during the time it is desired to unload the compressor. The controlling devices (not shown) will, as stated, automatically exhaust pressure fluid from the bore R to permit the valve to open when maximum receiver pressure is reached.

When conditions in the storage receiver are again such that the compressor may operate at full capacity as, for instance, when the storage pressure has dropped below the maximum values, pressure fluid will be admitted by the controlling devices (not shown) through the pipe $h$ into the bore R to return the valve T to its seat and the compressor will thereafter operate at full load. This movement of the valve will be a gradual movement as it wil be to some extent retarded by the pressure fluid in the chamber X and the valve will therefore approach its seat without sharply impacting thereagainst since it is adequately cushioned by the pressure fluid within the chamber X.

I claim:

1. A clearance valve assembly, comprising a valve guide having a bore, a valve in the bore having a chamber, means for introducing pressure fluid into the bore to close the valve, and means in the valve and stationary with respect to for controlling the admission and exhaust of fluid into and from the chamber to cushion the movement of the valve.

2. A clearance valve assembly, comprising a valve guide having a bore, a valve in the bore having a chamber, means for introducing pressure fluid into the bore to close the valve, and means in constant engagement with the valve for restricting the opening of the chamber for controlling the admission and exhaust of fluid into and from the chamber to cushion the movement of the valve.

3. A clearance valve assembly, comprising a valve guide having a bore, a valve in the bore having a chamber, means for introducing pressure fluid into the bore for closing the valve, and means in constant engagement with the valve to define the outlet opening of the chamber for controlling the flow of cushioning fluid into and from the chamber.

4. A clearance valve assembly, comprising a valve guide having a bore, a valve in the bore having a chamber, means for introducing pressure fluid into the bore for closing the valve, a plug extending through the valve, and a head on the plug lying in the chamber and in constant engagement with the wall thereof to define the outlet opening of the chamber for controlling the flow of cushioning fluid into and from the chamber.

5. A clearance valve assembly, comprising a valve guide having a differential bore, a valve in the bore having a chamber, a pressure surface on the valve, means for introducing pressure fluid into the bore to act against the pressure surface for closing the valve, a pressure area in the chamber of substantially the same area as the pressure surface, a plug extending through the valve, and a head on the plug lying in the chamber in constant engagement with the valve to define the outlet opening thereof for controlling the flow of cushioning fluid into and from the chamber.

In testimony whereof I have signed this specification.

CHARLES S. BAKER.